(12) United States Patent
Lum

(10) Patent No.: US 7,011,508 B2
(45) Date of Patent: Mar. 14, 2006

(54) MICRO PADDLE WHEEL PUMP FOR PRECISE PUMPING, MIXING, DISPENSING, AND VALVING OF BLOOD AND REAGENTS

(75) Inventor: Paul Lum, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/643,071

(22) Filed: Aug. 18, 2003

(65) Prior Publication Data

US 2004/0033147 A1   Feb. 19, 2004

Related U.S. Application Data

(62) Division of application No. 09/976,991, filed on Oct. 11, 2001, now Pat. No. 6,607,362.

(51) Int. Cl.
F04B 17/00 (2006.01)
F04B 35/04 (2006.01)

(52) U.S. Cl. .............................. 417/423.1; 417/423.7; 417/423.14

(58) Field of Classification Search ............. 417/423.1, 417/423.7, 423.14, 410.3; 604/151
See application file for complete search history.

(56) References Cited

U.S. PATENT DOCUMENTS

| | | | | |
|---|---|---|---|---|
| 5,174,726 A | * | 12/1992 | Findlay ...................... 417/205 |
| 5,370,509 A | * | 12/1994 | Golding et al. .......... 417/423.1 |
| 5,507,629 A | * | 4/1996 | Jarvik ...................... 417/423.3 |
| 5,678,306 A | * | 10/1997 | Bozeman et al. ...... 29/888.025 |
| 5,846,216 A | * | 12/1998 | Gonzales et al. .............. 604/2 |
| 6,176,847 B1 | * | 1/2001 | Humphreys et al. ........ 604/246 |
| 6,210,133 B1 | * | 4/2001 | Aboul-Hosn et al. .... 417/423.1 |
| 6,234,772 B1 | * | 5/2001 | Wampler et al. ....... 417/423.12 |
| 6,264,635 B1 | * | 7/2001 | Wampler et al. ............. 604/151 |
| 6,318,970 B1 | * | 11/2001 | Backhouse ................... 417/92 |
| 6,346,120 B1 | * | 2/2002 | Yamazaki et al. ......... 623/3.13 |
| 6,398,522 B1 | * | 6/2002 | Skill ....................... 417/410.3 |
| 6,415,821 B1 | * | 7/2002 | Kamholz et al. ........... 137/827 |
| 6,447,265 B1 | * | 9/2002 | Antaki et al. ............... 417/354 |
| 6,527,521 B1 | * | 3/2003 | Noda ......................... 417/355 |
| 6,529,377 B1 | * | 3/2003 | Nelson et al. .............. 361/699 |
| 6,607,362 B1 | * | 8/2003 | Lum ............................ 417/53 |
| 6,709,692 B1 | * | 3/2004 | Sudor ......................... 427/2.1 |
| 2003/0057391 A1 | * | 3/2003 | Krulevitch et al. ........... 251/11 |
| 2003/0073089 A1 | * | 4/2003 | Mauze et al. .................. 435/6 |
| 2003/0143754 A1 | * | 7/2003 | Lum et al. .................. 436/180 |

* cited by examiner

*Primary Examiner*—William H. Rodriguez

(57) ABSTRACT

An apparatus and method for making a microscopic paddle wheel coupled inductively by an external electromagnet and used for valving and active pumping so that the actual pumping mechanism is completely isolated from the electromagnetic driver. The paddle wheel is inexpensive to manufacture and disposable. A cartridge having a network of conduits and reservoirs contains several of such paddle wheels to transport blood and reagents. A point-of-care device houses the electromagnetic driving mechanism and is reused with successive cartridges since the paddle wheels are contained by the cartridge and do not contaminate the driving mechanism.

32 Claims, 2 Drawing Sheets

US 7,011,508 B2

MICRO PADDLE WHEEL PUMP FOR PRECISE PUMPING, MIXING, DISPENSING, AND VALVING OF BLOOD AND REAGENTS

This application is a divisional of U.S. Pat. No. 6,607,362 (Ser. No. 09/976,991) filed on Oct. 11, 2001.

FIELD OF THE INVENTION

The present invention is related to Micro Electro Mechanical Systems ("MEMS"). This field includes microfluidics, micro-pumping, micro-valves, precise fluid dispensing, micro-molding, and micro-magnetic actuators. More particularly, the invention relates to devices and methods for microscopic pumping, mixing, dispensing, and valving of blood and reagents.

BACKGROUND OF THE INVENTION

Micro-pumping for transporting small volumes of fluids is made possible by micro-pumps which use piezoelectric, surface wave, thermal, fluidic or static electric actuation to move diaphragms, membranes, flappers, wheels, or actual fluids. This has been discussed in the literature.

The term "micro" refers to objects of small scale having dimensions on the microscopic level. Such a microscopic level includes orders of magnitude of $1\times10^{-3}$ meters to about $1\times10^{-7}$ meters, where $1\times10^{-6}$ meters is commonly referred to as a micron. Such orders of magnitude correspond to dimensions such as volume and mass.

Blood flow sensors have been constructed out of polysilicon rotors. The goal of such devices is to position them in blood vessels and measure the flow that might change as a result of an occlusion. Rapoport, S. D., et al., *Fabrication and testing of a microdynamic rotor for blood flow measurements*, Journal of Micromechanical Microengineering 1, (1991), pp. 60–65. This article is incorporated by reference herein. A rotor 300 microns in diameter was machined out of polysilicon. A two micron thick hub was attached to the center of the rotor to allow the rotor to rotate in a seven micron gap. The rate of rotation of the rotor is measured using a microscopic permanent magnet to modulate the resistance of a permalloy placed near the rotor. The change in resistivity provides an electrical signal, the frequency of which is proportional to the rotation rate, and hence the velocity.

The durability and robustness of micro rotors has been improved by adding polysilicon bearings to the point of rotation to overcome the lack of ball bearings and lubricants which exist in conventional sized rotors. Tavrow, Lee S., *Operational characteristics of microfabricated electric motors*, Sensors and Actuators 35 (1992), pp. 33–44. This article is incorporated by reference herein. The life of the rotor is increased significantly with the addition of such bearings.

In conventional magnetic actuators, most of the magnetic energy is stored in the gap due to the large reluctance of the magnetic core. However, in magnetic micro-actuators the fabrication limitations on the achievable cross-sectional area of the magnetic core as well as the finite core permeability increase the core reluctance to the point that this assumption may no longer be valid. Nami, Z. et al., *An energy-based design criterion for magnetic microactuators*, Journal of Micromechanical Microengineering 6, (1996), pp. 337–344. This article is incorporated by reference herein. The reluctance problem is overcome by sizing the gap between core and coils according to the actuator requirements so that the reluctance of the gap and the reluctance of the core are equal.

In order to produce a magnetic force (or actuation) at a specific location, magnetic micro-actuators should have an inductive component to generate magnetic flux to the point where actuation takes place. Ahn, Chong H., et al., *A fully integrated surface micromachined magnetic microactuator with multi-meander magnetic core*, Journal of Microelectromechanical Systems, Vol. 2, No. 1, March 1993. This article is incorporated by reference herein. Directed pin-point actuation has been achieved using solenoid coils and micromachined nickel-iron cores on the order of 25 microns wide and requiring a current of 800 mA for actuation.

Magnetic micro-platforms, on the order of one $mm^2$, powered by local electromagnets, require a current of 182 mA for actuation due to improvements in the local magnetic source by reducing reluctance and using thinner micro-platforms which reduce the length the electromagnetic field must travel through air. Chang, Carl, et al., *Magnetically actuated microplatform scanners for intravascular ultrasound imaging*, MEMS-Vol. 2 Micro-Electro-Mechanical Systems (MEMS)-2000, ASME 2000. This article is incorporated by reference herein.

Piezoelectric micro motors have been designed with diameters of 2–5 mm which require four volts at 90 kHz to generate 100–300 rpm. Flynn, Anita M., *Piezoelectric Ultrasonic Micromotors*, Massachusetts Institute of Technology, PhD dissertation June 1995. This paper is incorporated by reference herein. These devices are ultrasonic and provide the advantage of a holding torque when the sound wave is not traveling between the stationary and rotating aspects of the motor.

Methods for fabricating such devices using processes similar to integrated circuit manufacturing have been suggested. Zettler, Thomas, *Integrated circuit fabrication compatible three-mask tungsten process for micromotor and gears*, Sensors and Actuators 44, (1994), pp. 159–163. This reference in incorporated by reference herein.

The problem with existing microdevices is that several units are necessary to pump, valve, mix, and meter blood and reagents. This is prohibitive where space is limited, such as in a hand-held point-of-care device for analyzing blood samples. For such an application compact design and mass manufacturing are necessary due to the size and biohazard constraints. Henceforth, the term "biological fluid" will be used to mean bodily fluid samples, such as blood, and/or other reagent chemicals; such reagents preferably support a variety of analytical methods including electrochemical, chemiluminescence, optical, electrical, mechanical, and others, for determination of blood pH, $pO_2$, $pCO_2$, $Na^+$, $Ca^{++}$, $K^+$, hematocrit, glucose, and coagulation and hemoglobin factors.

It is accordingly a primary object of the invention to integrate valving, pumping, mixing, and metering of biological fluid by incorporating the valve and pump mechanisms as an integral micro-pumping unit that can be manufactured at low cost such that the user can discard a device using such micro-pumps after a single use.

This is achieved by designing the micro-pump so that it is easily fabricated with existing MEMS and plastics technologies. The micro-pump is assembled within a disposable cartridge that operates in conjunction with a point-of-care analytical device. During the fabrication and assembly process of such a cartridge, the micro-pumps may be discretely fabricated and tested then assembled into the cartridge. Alternatively, the micro-pumps may be assembled within such a cartridge and tested on the actual cartridge itself once it has been inserted into the point-of-care analytical device.

SUMMARY OF THE INVENTION

In accordance with the invention, a microscopic paddle wheel is coupled inductively by an external electromagnet and is used for valving and active pumping. Such a system takes advantage that the actual pumping mechanism is completely isolated from the electromagnet driver. The paddle wheel is inexpensive to manufacture and disposable. A cartridge may have a network of conduits and reservoirs containing several such paddle wheels to transport biological fluid. A point-of-care device housing the electromagnetic driving mechanism is reused with successive cartridges since the paddle wheels are contained by the cartridge and do not contaminate the driving mechanism.

An inductive drive such as an electromagnet and a magnetic core incorporated within the paddle wheel to actuate the motion may be separated by either plastic or silicon approximately one millimeter thick and still maintain an inductive coupling with the paddle wheel such that the magnetic core spins by rotating the magnetic field. The electromagnet may be a micro-coil which causes the paddle wheel to move according to the alternating field in the micro-coil.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawing, which is incorporated in and constitutes a part of this specification, illustrates an embodiment of the invention and, together with the description, serves to explain the principles of the invention.

DESCRIPTION OF THE EMBODIMENTS

Figure 1:
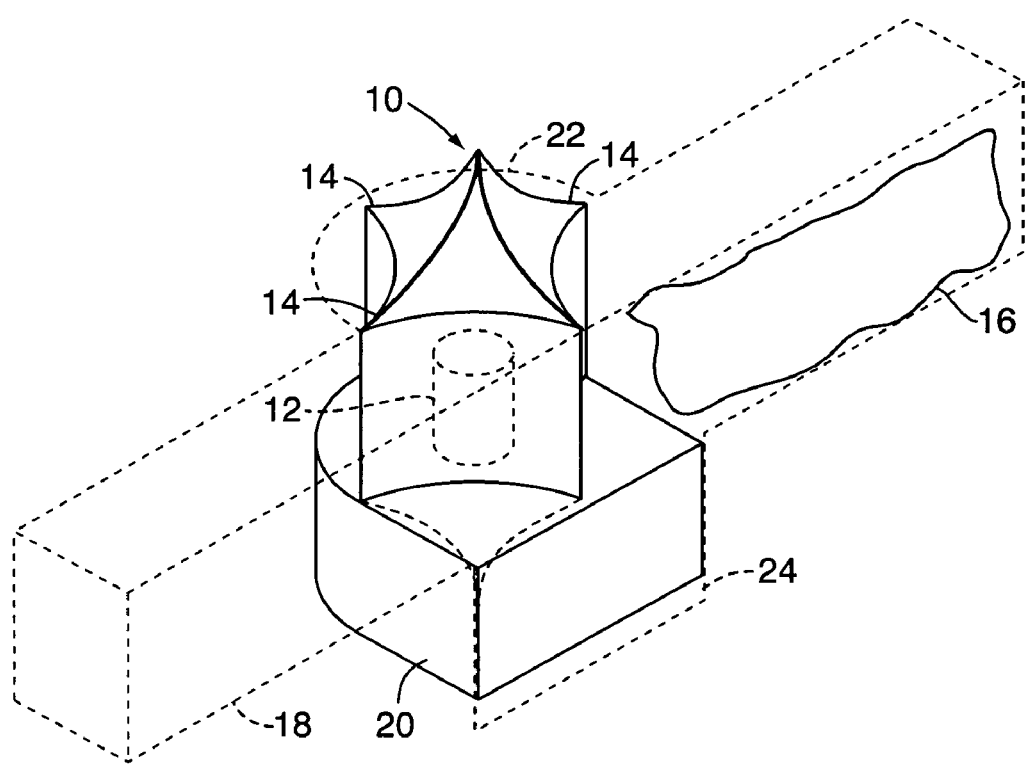
FIG. 1 is a three-dimensional cut-away drawing of the paddle wheel resting within a conduit housed in a cartridge.

The term "micro pumping device" refers to a pump using momentum transfer principles on the microscopic scale. A micro pumping device cannot contain many movable parts since it must be constructed from micro molding techniques.

Micro-molded devices are made and molded using LIGA (German acronym for Lithographie, Galvanoformung, Abformung). LIGA processes use lithography, electroplating, and molding to produce microstructures. These processes are capable of creating finely defined microstructures of up to 1000 $\mu$m high. The paddle wheel does not require such fine definition and may have microstructures up to several millimeters high. The paddle wheel may be fabricated by LIGA or other micro-molding techniques separate from the cartridge which houses the paddle wheel. The paddle wheels are small enough to be integrated upon final assembly of the cartridge by being dropped into place in the cartridge molded housing.

Various micro-machining technologies have been developed for MEMS devices and structures. Micro-riveting has been developed to mechanically join two plates together while avoiding the demanding processes of bonding. Micro-channeling to form conduits, a basic building block for microfluidic devices, uses a simple, room-temperature procedure, which requires only one-mask step and no bonding. Many of the techniques used in integrated chip design have been applied to MEMS, such as detailed lithography. Process technologies include focused ion beam (FIB) micro-manufacturing to create cutting tools for use in making microstructure molds and deep x-ray lithography (DXRL) masks that are used to create micro-mechanical structures and systems.

The paddle wheels may be molded with a small solid magnetic core such as iron embedded in the center to serve as the actuator which is inductively coupled by the electromagnet. The paddle wheel is molded precisely so that the magnetic core is centered vertically and radially within the paddle wheel. The paddle wheel is positioned precisely so that the alignment of the magnetic core allows for accurate movement by the electromagnet. Precise micro-droplet dispensing is used to micro-pick and place the paddle wheel into micro-pump conduits that contain paddle wheel chambers to house the paddle wheels recessed in the conduits to facilitate cartridge assembly. Many paddle wheels may be placed within the conduits of the cartridge.

Micro-droplet dispensing for positioning the micro paddle wheel comprises using micro-manipulation with micro-grippers powered by micro-motors. The micro-grippers, which resemble forceps, may be configured such that when closed together the grippers form a cavity similar to the exterior shape of the micro paddle wheel. The gripper surface may have variable roughness depending of the hardness of the material used to construct the micro paddle wheel to avoid damaging the micro paddles during gripping and dispensing.

To facilitate micro-assembly, the paddle wheel can be positioned into the paddle wheel chamber with the aid of a member of the shaped to fill a portion of the paddle wheel chamber and couple to the paddle wheel. The member can be constructed of a similar material as the paddle wheel to avoid fluid effects between the paddle wheel and the member. Even if constructed of a different material, the member should exhibit the same hydrophobic surface properties as the paddle wheel.

The point-of-care device may contain many electromagnets in the form of small coils distributed throughout the surface of the device that interact with the cartridge. The electromagnets do not require a significant amount of current and power to drive the paddle wheels and transport biological fluid throughout the cartridge. The paddle wheels also act as valves to isolate the biological fluid prior and after pumping to control reaction time and isolate analytical reactions. This is achieved by taking advantage of the capillary flow properties of fluids when the paddle wheel is inactive.

The paddle wheel includes a hydrophobic surface which repels the biological fluid. The paddle wheel is made of a hydrophobic polymer such that its surface has such hydrophobic properties. In motion, the paddle wheel does not adhere to the biological fluid. When inactive, the paddle wheel repels the biological fluid to create a barrier and valve the conduit. The conduit includes a hydrophilic interior wall to attract the biological fluids as they pass by the paddle wheel. The conduit wall is made hydrophilic by using plasma or corona surface treatment.

While polymers, particularly materials like polypropylene and polyethylene, offer many beneficial properties for MEMS, their hydrophobic properties (poor wettability) creates limitations when it comes to designing conduits out of these materials. Ideally, the surface energy of the polymer conduit should be about 10 dynes/cm greater than the surface tension of the biological fluid such that the fluid "wets" the surface.

Corona surface treatment uses an electric current to create an ozone generating spark which increases the polymer's surface energy. The ozone within the corona reacts with the polymer surface to raise the energy level. The corona surface treatment process includes passing the polymer through a highly charged electrical field which bombards the surface in the presence of oxygen (air). This microsurface modification through oxidation makes the surface hydrophilic, thus increasing its wettability.

Plasma surface treatment, in general, changes the wetting properties of polymers. Plasma treatment cures this problem by treating the polymer with a partially ionized gas or mixture of gases. The ionized particles are accelerated in an electrical field such that their energy of excitation is comparable or exceeds the bond energy of the polymer surface. When the ionized particles strikes the solid polymer surface it ejects an electron (secondary electron emission) or atom (sputtering), traps the ionized particles (ion implantation, electron trapping), becomes structurally rearranged at points or throughout the surface, chemically reacts with the ionized particles, or a combination of the above. The plasma may also comprise UV radiation that also that aids in the surface treatment process.

The parameters of the plasma treatment, including but not limited to frequency, intensity, pressure, and mixture of gases, vary depending on the polymer and its surface properties and the degree of hydrophilic conversion desired. Plasma treatment is usually fast and affects about 10 nanometers of the uppermost polymer surface layer. The increase of wettability of the film is attributed to a combination of factors including UV radiation and oxidation of functional groups to alter the oxygen to carbon atomic ratio on the polymer surface.

The paddle wheels also mix components of the biological fluid passing though the paddle wheel simultaneously by using the torsion forces of the paddles to create turbulence and mix the biological fluid passing through the micro-pump. The torsion force, however, does not exceed the level that would lyse or puncture blood cells.

The number of turns of the paddle wheel may serve as a precision meter of how much biological fluid is pumped. The precise molding of the paddle wheel allows for specific volumes of biological fluid to be metered between each pair of paddles. The accurate control by the electromagnet allows the rotation of the paddle wheel to be manipulated so that a known amount or metered volume of biological fluid is allowed to pass through the micro-pump. By coupling the micro-pump in such an exact manner the point-of-care analytical device uses an algorithm to establish precise flow rates and dispense precise biological fluid ratios such as between blood and reagent. The device may control the mixing ratio of blood and reagent by dispensing blood and reagents at different flow rates into a common mixing reservoir. Such control allows more accurate aliquots for the analytical assays carried out by the device.

Reference will now be made in detail to the present embodiment of the invention, an example of which is illustrated in the accompanying drawing. Wherever possible, the same reference numbers will be used throughout the drawing to refer to the same or like parts.

Biological fluids are attracted to hydrophilic surfaces and repulsed by hydrophobic surfaces. FIG. 1 shows the paddle wheel (10) with embedded magnetic core (12). The paddle wheel (10) comprises of several paddles (14). The paddles (14) are fabricated from polymer materials, such as polyvinyl chloride, which are hydrophobic. The biological fluid (16) will be repulsed by the surface of the paddles (14). The conduit (18) has an inside surface treated with corona or plasma surface treatments which render the surface hydrophilic. The biological fluid (16) will be attracted to the inside surface of conduit (18). To reduce head space and facilitate manufacturing a D-shaped member (20) fabricated from hydrophobic polymer material may be used to fill the area above and below the paddle wheel (10).

The paddle wheel (10) has two protrusions along its rotational axis which act as pivot points for the rotation of the paddle wheel (10) leaving the paddles (14) free to rotate. The diameter (D) of the paddle wheel (10), as measured by the width of the opposing paddles (14), is greater than the width (W) of the conduit (18). These protrusions fit within a cylindrical cavity within each of the D-shaped member (20). The paddle wheel (10) fits into the paddle wheel chamber (22) recessed in conduit (18). The paddle wheel chamber (22) adds sufficient width to the width (W) of the conduit (18) to accommodate the diameter (D) of paddle wheel (10). The D-shaped member (20) fills the vertical expansion (24) of the conduit (18). There is a second D-shaped member (not shown) filling a second vertical expansion (not shown) above the paddle wheel (10). The member (20) facilitates assembly of a cartridge by inserting the member (20) in expansion (24) then inserting the protrusion of paddle wheel (10) into the cylindrical cavity of member (20). The member (20) similar to the paddle wheel (10) repulses the biological fluid (16). The combined hydrophobic surface conditions created by both the paddles (14) and member (20) prevent the biological fluid (16) from flowing into the overhead regions of the micro-pump to reduce the total fluid volume requirements necessary for operating the pump. The member (20) acts as a hydrophobic member to facilitate assembly and reduce overhead flow.

When the paddle wheel (10) is stationary, the hydrophilic interior surface of the conduit (18) and the hydrophobic surface of paddles (14) retain the biological fluid (16) on one side of the paddle wheel (10) allowing the micro-pump to act as a valve. When the paddle wheel (10) is in rotational motion, as a result of changing the field of the electromagnet (not shown), the hydrophobic surface of the paddles (14) will sweep the biological fluid (16) from the hydrophilic surface of conduit (18) upstream of the paddle wheel (10) to the hydrophilic surface of conduit (18) downstream of the paddle wheel (10).

The scooping area between paddles (14) is preferably sized to accommodate a predetermined volume of biological fluid (16) moved with each rotation of the paddle wheel (10). In addition, the paddle wheel (10) may be used to mix the components of the biological fluid (16).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Figure 2:
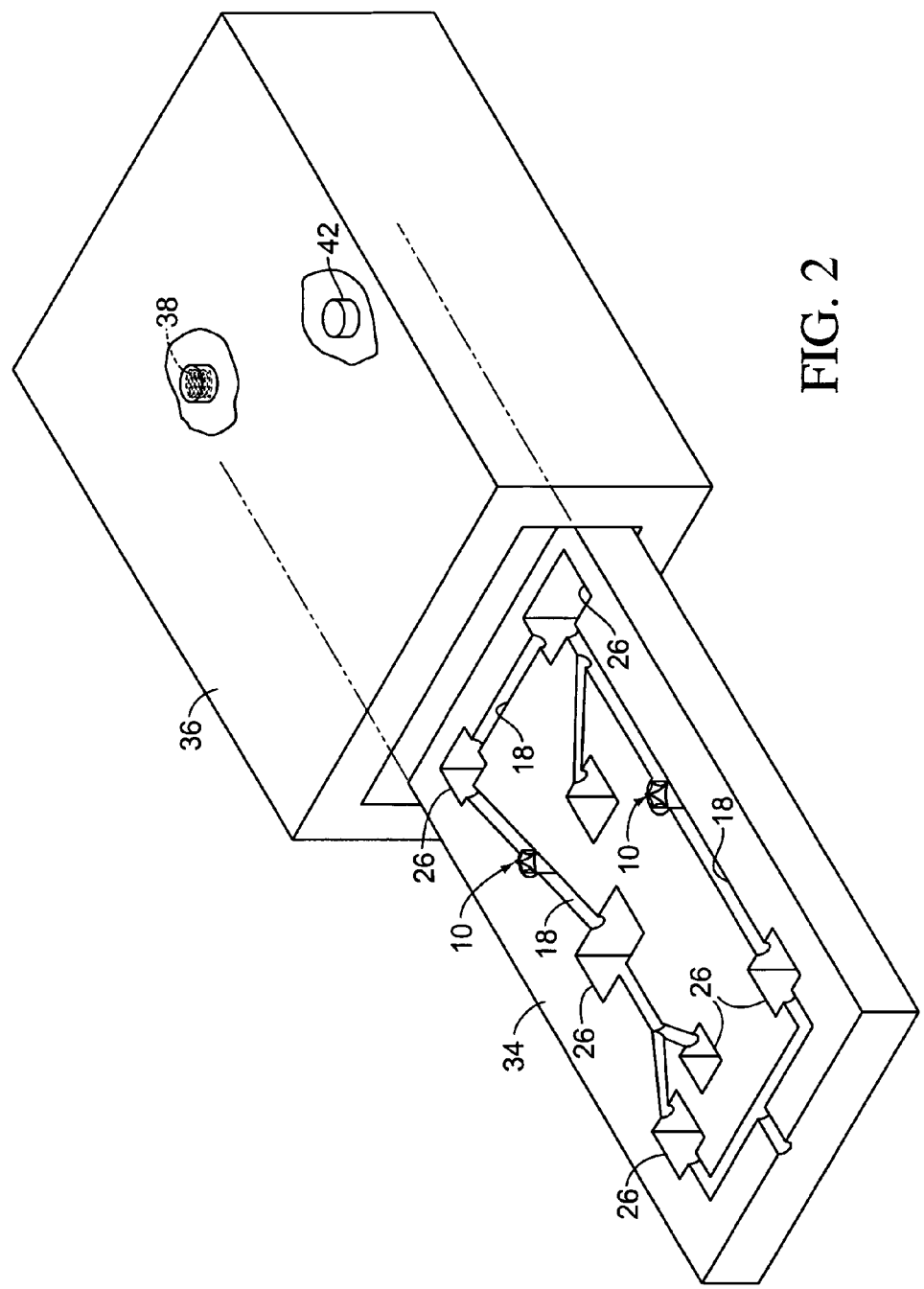
FIG. 2 is a three-dimensional cut-away drawing of the point-of-care analytic device, and an associated cartridge showing a network of conduits and reservoirs, according to one or more embodiments of the present invention.

FIG. 2 illustrates a representative point-of-care analytic device 36 as well as a cartridge, such as a disposable cartridge 34, that operates in conjunction with a point-of-care analytical device 36. The disposable cartridge 34 can have a network of conduits 18 and reservoirs 26 containing several paddle wheels 10 to transport biological fluid. According to one or more embodiments, the paddle wheels 10 may be coupled inductively to an external electromagnet 42 that can be housed within the point-of-care analytic device 36. In some embodiments, the electromagnetic drive mechanism can be a micro-coil 38 which causes the paddle wheel 10 to move according to the alternating field in the micro-coil 38.

What is claimed is:

1. A disposable cartridge that operates in conjunction with a point-of-care analytical device, said cartridge comprising:
    a network of conduits and reservoirs within said cartridge; and
    at least one micro pump fluidly coupled to said network for transporting small volumes of biological fluid, said pump comprising:
    a rotatable portion having a magnetic core and configured to be rotatable by alternating inductive magnetic fields to urge fluid through said network,
    wherein said rotatable portion comprises a microscopic paddle wheel.

2. The disposable cartridge of claim 1 wherein said alternating inductive magnetic fields provide a torsion force to the rotatable portion that does not exceed the level that would lyse or puncture blood cells.

3. The disposable cartridge of claim 1 wherein a plurality of micro pumps are placed within the network of the cartridge.

4. The disposable cartridge of claim 1 wherein said micro pump is fluidically isolated from a source of the alternating inductive magnetic fields.

5. The disposable cartridge of claim 1 wherein the rotatable portion is contained within the disposable cartridge so that the rotatable portion is isolated from and does not contaminate a source of the alternating inductive magnetic fields.

6. The disposable cartridge of claim 1 wherein an actual pumping mechanism of the micro pump is completely isolated from a source of the alternating inductive magnetic fields.

7. The disposable cartridge of claim 1 wherein the paddle wheel in micro-pump conduits that contain paddle wheel chambers to house the paddle wheels recessed in the conduits to facilitate cartridge assembly.

8. The disposable cartridge of claim 1 wherein the paddle wheel acts as a valve in the network to isolate the biological fluid prior and after pumping to control reaction time and isolate analytical reactions.

9. A disposable cartridge that operates in conjunction with a point-of-care analytical device, said cartridge comprising:
    a network of conduits and reservoirs within said cartridge; and
    at least one micro pump fluidly coupled to said network for transporting small volumes of biological fluid, said pump comprising:
    a rotatable portion having a magnetic core and configured to be rotatable by alternating inductive magnetic fields to urge fluid through said network,
    wherein said rotatable portion comprises a microscopic paddle wheel having a hydrophobic surface.

10. The disposable cartridge of claim 9 wherein said alternating inductive magnetic fields provide a torsion force to the rotatable portion that does not exceed the level that would lyse or puncture blood cells.

11. The disposable cartridge of claim 9 wherein a plurality of micro pumps are placed within the network of the cartridge.

12. The disposable cartridge of claim 9 wherein said micro pump is fluidically isolated from a source of the alternating inductive magnetic fields.

13. The disposable cartridge of claim 9 wherein the rotatable portion is contained within the disposable cartridge so that the rotatable portion is isolated from and does not contaminate a source of the alternating inductive magnetic fields.

14. The disposable cartridge of claim 9 wherein an actual pumping mechanism of the micro pump is completely isolated from a source of the alternating inductive magnetic fields.

15. The disposable cartridge of claim 9 wherein the paddle wheel in micro-pump conduits that contain paddle wheel chambers to house the paddle wheels recessed in the conduits to facilitate cartridge assembly.

16. The disposable cartridge of claim 9 wherein the paddle wheel acts as a valve in the network to isolate the biological fluid prior and after pumping to control reaction time and isolate analytical reactions.

17. A point-of-care analytical device, said device comprising:
    a disposable cartridge;
    a network of conduits and reservoirs within said cartridge;
    a micro pump fluidly coupled to said network for transporting small volumes of biological fluid, said pump comprising a rotatable portion configured to be rotatable by alternating inductive magnetic fields to urge fluid through said network; and
    an external electromagnet providing said alternating inductive magnetic fields for causing the rotatable portion to move to transport small volumes, said electromagnet positioned external to said disposable cartridge and fluidically isolated from said micro pump;
    wherein said rotatable portion comprises a microscopic paddle wheel coupled inductively to said external electromagnet.

18. The point-of-care device of claim 17 wherein the electromagnet is reused with successive disposable cartridges and the rotatable portion is contained in the cartridge and does not contaminate the electromagnet.

19. The point-of-care device of claim 17 wherein an actual pumping mechanism of the micro pump is completely isolated from said external electromagnet.

20. The point-of-care device of claim 17 wherein the electromagnet comprises a micro-coil which causes the paddle wheel to move according to the alternating field in the micro-coil.

21. The point-of-care device of claim 17 wherein the paddle wheel in micro-pump conduits that contain paddle wheel chambers to house the paddle wheels recessed in the conduits to facilitate cartridge assembly.

22. The point-of-care device of claim 17 where the paddle wheels act as valves in the network to isolate the biological fluid prior and after pumping to control reaction time and isolate analytical reactions.

23. The point-of-care device of claim 17 wherein said alternating inductive magnetic fields provide a torsion force to the rotatable portion that does not exceed the level that would lyse or puncture blood cells.

24. The point-of-care device of claim 17 wherein a plurality of micro pumps are placed within the network of the cartridge.

25. The point-of-care device of claim 17 wherein the rotatable portion is contained within the disposable cartridge so that the rotatable portion is isolated from and does not contaminate said external electromagnet.

26. A point-of-care analytical device, said device comprising:
- a disposable cartridge;
- a network of conduits and reservoirs within said cartridge;
- a micro pump fluidly coupled to said network for transporting small volumes of biological fluid, said pump comprising a rotatable portion configured to be rotatable by alternating inductive magnetic fields to urge fluid through said network; and
- an external electromagnet providing said alternating inductive magnetic fields for causing the rotatable portion to move to transport small volumes, said electromagnet positioned external of said disposable cartridge and fluidically isolated from said micro pump;
- wherein said rotatable portion comprises a microscopic paddle wheel coupled inductively to said external electromagnet; and
- wherein the paddle wheel to actuate the motion may be separated by either plastic or silicon and still maintain an inductive coupling with the paddle wheel such that the magnetic core spins by rotating the magnetic field.

27. The point-of-care device of claim 26 wherein the electromagnet is reused with successive disposable cartridges, and wherein an actual pumping mechanism of the micro pump is contained within the cartridge so that it is completely isolated from and does not contaminate said external electromagnet.

28. The point-of-care device of claim 26 wherein the electromagnet comprises a micro-coil which causes the paddle wheel to move according to the alternating field in the micro-coil.

29. The point-of-care device of claim 26 wherein the paddle wheel in micro-pump conduits that contain paddle wheel chambers to house the paddle wheels recessed in the conduits to facilitate cartridge assembly.

30. The point-of-care device of claim 26 wherein said alternating inductive magnetic fields provide a torsion force to the rotatable portion that does not exceed the level that would lyse or puncture blood cells.

31. The point-of-care device of claim 26 wherein a plurality of micro pumps are placed within the network of the cartridge.

32. The point-of-care device of claim 26 wherein the paddle wheel acts as a valve in the network to isolate the biological fluid prior and after pumping to control reaction time and isolate analytical reactions.

* * * * *